United States Patent [19]
Bederke et al.

[11] Patent Number: 4,839,414
[45] Date of Patent: Jun. 13, 1989

[54] PIGMENT DISPERSION AND ITS USE

[75] Inventors: Klaus Bederke, Sprockhovel; Thomas Brock, Hurth; Hermann Kerber, Wuppertal; Paul Rupieper, Velbert, all of Fed. Rep. of Germany

[73] Assignee: Herberts Gesellschaft mit beschrankter Haftung, Wuppertal, Fed. Rep. of Germany

[21] Appl. No.: 86,931

[22] Filed: Aug. 18, 1987

[30] Foreign Application Priority Data

Aug. 19, 1986 [DE] Fed. Rep. of Germany ....... 3628123

[51] Int. Cl.$^4$ .................. B01F 17/52; C09B 67/20; C09D 3/48
[52] U.S. Cl. ........................ 524/507; 524/88; 524/315; 524/555; 524/589; 525/123; 525/124; 525/127; 525/131; 525/328.4; 525/377
[58] Field of Search ............ 524/507, 555, 589, 88, 524/315; 525/328.4, 377, 123, 127, 131, 124

[56] References Cited

U.S. PATENT DOCUMENTS

| | | | |
|---|---|---|---|
| 4,059,547 | 11/1977 | Speakman | 524/555 |
| 4,310,398 | 1/1982 | Gimpel et al. | 524/555 |
| 4,339,365 | 7/1982 | Becher et al. | 524/507 |
| 4,410,657 | 10/1983 | Loch | 524/389 |
| 4,442,145 | 4/1984 | Probst et al. | 525/124 |
| 4,444,954 | 4/1984 | Mels et al. | 524/555 |
| 4,512,860 | 4/1985 | Abbey et al. | 524/555 |
| 4,532,300 | 7/1985 | Lenz et al. | 524/124 |
| 4,543,393 | 9/1985 | Blum et al. | 525/124 |
| 4,544,687 | 10/1985 | Schupp et al. | 524/507 |
| 4,554,306 | 11/1985 | Carroll | 524/507 |
| 4,576,979 | 3/1986 | Schupp et al. | 524/507 |
| 4,578,426 | 3/1986 | Lenz et al. | 524/124 |
| 4,594,374 | 6/1986 | Stahl et al. | 524/507 |
| 4,647,647 | 3/1987 | Haubennestel et al. | 524/440 |
| 4,687,813 | 8/1987 | Lenz | 525/124 |

FOREIGN PATENT DOCUMENTS

| | | | |
|---|---|---|---|
| 0074594 | 7/1978 | Japan | 525/124 |
| 0039443 | 3/1979 | Japan | 525/124 |
| 2051072 | 1/1981 | United Kingdom | 525/124 |

Primary Examiner—Herbert J. Lilling
Attorney, Agent, or Firm—M. O. Warnecke; D. A. Peterson

[57] ABSTRACT

A pigment dispersion and its use for the preparation of coating compounds are described. The dispersion contains a pigment, solvent and pigment dispersing agent. The pigment dispersing agent is a copolymer containing OH groups, obtainable by the reaction of:

(A) 80 to 95% by weight of a copolymer of:
  (a) 0.5 to 40% by weight of N,N-di-C1 to 4-alkylamino-$C_1$ to $_8$-alkyl(meth)acrylamides and/or a mixture of N,N-di-C to 4-alkylamino-$C_1$ to $_8$-alkyl(meth)acrylates and N-substituted (meth)acrylamides and/or (meth)acrylamide in which the ratio of amino(meth)acrylates to amido(meth)acrylates should be in the range of from 1:2 to 2:1,
  (b) 10 to 40% by weight of hydroxy-$C_{2-8}$-alkyl (meth)acrylates and
  (c) 20 to 89.5% by weight of copolymerizable, α, β-olefinically unsaturated compounds with
(B) 5 to 20% by weight of a polyisocyanate containing unmasked and optionally also masked isocyanate groups as well as biuret, urethane or isocyanurate groups.

8 Claims, No Drawings

PIGMENT DISPERSION AND ITS USE

BACKGROUND OF THE INVENTION

1. Field of the Invention

This invention relates to a pigment dispersion which is suitable for the preparation of coating compounds and contains at least one solvent and a pigment dispersing agent, which pigment dispersing agent comprises a copolymer containing OH (hydroxy) groups and containing ethylenically unsaturated monomers incorporated by polymerization. The invention also relates to the use of such pigment dispersing agents for the preparation of coating compounds, in particular lacquers.

2. Description of the Related Art

Coating compounds such as lacquers, paints, fillers and primers contain film forming binders and pigments as their main constituents as well as the usual additives. One major problem in the preparation of such coating compounds is that of achieving satisfactory dispersion of the pigments and at the same time ensuring that an optimum state of dispersion, once obtained, is not lost during storage of intermediate products used for the preparation of lacquers or of the lacquers themselves, or during working up and application of the products. The said intermediate products are mainly pigment pastes and grinding pastes. Pigment pastes containing the desired pigments and pigment dispersing agents as well as other additives in solvents are available on the market. Grinding pastes frequently also contain binders of the kind used in the coating compound into which the pastes are to be made up. These problems are particularly difficult in lacquers used for motor car repairs because these are sold in relatively small quantities and often stored for a very long time in the repair works of garages before they are used.

The quality of a pigment dispersion also depends on the nature of the binder in the coating compound and the nature of the pigment. Coating compounds containing, for example, alkyl resins as binders generally provide more stable pigment dispersions than, for example, acrylic resins. Some pigments are readily dispersed and form stable dispersions while others, known in the art as "critical" pigments, give rise to considerable problems; they are very difficult to disperse and keep in dispersion and the coating compounds containing them therefore have a poor storage stability.

Some pigments, including some of those described in the Examples, tend to flocculate and float to the surface if they are not well dispersed and may also cause other pigments present to undergo this form of separation. Coarsening of the pigment particles and floating to the surface frequently affect the intensity and gloss of the color and its position in the spectrum (shift of the optical remission of the finished paint to other wave lengths).

When the known dispersing agents of the prior art are used for the preparation of coating compounds, flow problems may arise, e.g. the substances may be insufficiently fluid in the mills (e.g. in closed ball mills with stirrers). This adversely affects the energy consumption and the output.

This problem has partly been solved to a more or less satisfactory extent by the use of so called pigment dispersing agents as described, for example, in DE-C-22 18 613, EP-A-52 224 and EP-A-154 678 and by J. Toole in Developments in Hyperdispersants Technology for Paints: Paint & Resin—February 1985. Experiments have shown that when the pigment dispersing agent used in EP-A-52 224, Example 1, is used for very finely divided, high quality pigments for motor car top coat lacquers, they give rise to very poor viscosity characteristics so that the pigments are virtually impossible to use in ball mills with stirrers. The bone soot mentioned in Example 1 of EP-A-52.224 is not one of the finest high quality pigments. The figures given for the fineness of grinding in EP-A-52 224 also indicate incomplete dispersion or the use of less than high quality pigments which can be dispersed with a relatively small quantity of dispersing agent.

The pigment dispersions described in the Examples of DE-C-22 18 613 contain very high proportions of dispersing agent, based on the quantity of pigments. Such a high proportion of dispersing agent limits the field of application of such pigment dispersions so that they are not universally unusable.

Excellent results can in many cases be obtained with the dispersing agents described in EP-A-154 678 although the problems described above may occur in some of the particularly critical pigments. The following are examples of such very critical pigments:
quinacridone C.I.: P.R. 122
red azo pigment C.I.: P.R. 170
tetrachlorothioindigo C.I.: P.R. 88
perylene C.I.: P.R. 179
tetrachloro-isoindolinone C.I.: P.Y. 110
highly oxidized carbon black C.I.: P.Bl. 7
phthalocyanine blue C.I.: P.B. 15:4
chlorinated and brominated phthalocyanines C.I.: P.G. 7 and P.G. 36.

SUMMARY OF THE INVENTION

It is an object of the present invention to avoid the disadvantages of the known dispersing agents and ensure good dispersion of the pigments, especially when so called "critical" pigments are used, so that the coating compounds obtained are sufficiently stable over long periods to produce satisfactory coatings, in particular lacquers.

It has been found that this problem can surprisingly be solved to a large extent by using the pigment dispersing agents defined below.

The present invention thus relates to a pigment dispersion suitable for the preparation of coating compounds, containing at least one pigment and at least one solvent and a pigment dispersing agent, which dispersing agent consists of a co-polymer carrying OH (hydroxy) groups and containing ethylenically unsaturated monomers incorporated by polymerization, characterized in that the copolymer is obtainable by the reaction of (A) 80 to 95% by weight of a copolymer of
  (a) 0.5 to 40% by weight of N,N-di-$C_1$ to 4-alkylamino-$C_1$ to 8-alkyl(meth)acrylamides and /or a mixture of N,N-di-$C_1$ to 4-alkylamino-$C_1$ to 8-alkyl(meth)acrylates and N- substituted (meth)acrylamides and/or (meth)acrylamide, wherein the ratio of amino(meth)acrylates to amido(meth) acrylates is preferably in the range of from 1:2 to 2:1,
  (b) 10 to 40% by weight of hydroxy-$C_2$-8-alkyl(meth)acrylates, preferably hydroxy-$C_2$-4-alkyl (meth) acrylates and
  (c) 20 to 89.5% by weight of copolymerizable α, β-olefinically unsaturated compounds; with (B) 5 to 20% by weight of a polyisocyanate containing unmasked and optionally also masked isocyanate groups in addition to biuret, urethane or isocyanurate groups.

The invention further relates to the use of the pigment dispersing agents defined above for the preparation of coating compounds on an organic and/or aqueous vehicle or carrier basis.

DETAILED DESCRIPTION OF THE INVENTION

The pigment dispersing agents used according to the invention provide surprisingly good dispersion of pigments in general and especially also of "critical" pigments as shown in comparison experiments. A very good dispersion of pigments is generally obtained by the present invention even in pigment pastes and pigment grinding pastes containing a very high proportion of pigment. The presence of a higher proportion of pigment in the grinding material, which may in some cases be three times the proportion ordinarily used in the art, results in higher productivity since the viscosity and hence the effort or energy required for dispersion remain within the normal range. As a net result, better dispersion is obtained with less effort and expense or cost.

Optimum utilization of the pigments is achieved due to the thorough and rapid grinding process and stabilization against flocculation.

The copolymer described above is used as component A for the preparation of the pigment dispersing agent used according to the invention. This copolymer is reacted with the polyisocyanates described above as component B. The quantity of component A amounts to at least about 80% by weight and the quantity of component B therefore at the most 20% by weight, the sum of components A and B being 100. The quantitative proportions must always be so chosen, bearing in mind the compounds used in any particular case, that the reaction product of A and B has a sufficient OH (hydroxyl) group content, e.g. an OH number of at least 60. The OH number is preferably at least 80 and the upper limit is suitably about 150, preferably about 120.

Component A is a copolymer of the above described monomers. Compounds of component (a) may contain both a tertiary amino group and a N- substituted amide group in the molecule, e.g. N,N-dimethyl-aminopropylmethacrylamide. For the preparation of the copolymer according to the invention, such compounds may be used alone or in combination with (meth)acrylates containing tertiary amino groups and/or N- substituted (meth) acrylamides and/or (meth)acrylamide. Mixtures of (meth) acrylates containing tertiary amino groups and N-substituted (meth)acrylamides or (meth)acrylamide itself may also be used. The expression "poly(meth)acrylates" is intended to encompass polyacrylates and polymethacrylates. The expression poly(meth)acrylate has the same construction. The proportion in the combination of compounds containing tertiary amino groups to compounds containing N- substituted or unsubstituted amide groups is preferably in the range of 1:1.1 to 1.1:1.

The following are preferred compounds used as monomer component (a):

Examples of N,N-di-$C_1$ to 4-alkylamino-C to 8- alkyl(meth) acrylamides are N,N-diethylamino-propyl-methacrylamide, the corresponding di-n-butyl compound, N,N-dimethyl-amino- neopentyl-methacrylamide and the coresponding aminomethyl and aminooctyl compounds. N,N-dimethylamino-propyl-methacrylamide is particularly preferred.

Instead of or in addition to N,N-di-$C_1$ to 4-amino-$C_1$ to 8- alkyl(meth)acrylamides there may be used a mixture of N,N- di-$C_1$ to 4-alkylamino-$C_1$ to 8-alkyl(meth)acrylates and N- $C_1$ to 12 alkyl(meth)acrylamides or N-$C_1$ to 12 cycloalkyl (meth)acrylamides or N-$C_1$ to 12-aralkyl(meth)acrylamides and/or (meth)acrylamide.

The following are examples of N,N-di-$C_1$ to 4-alkylamino-$C_1$ to 8-alkyl(meth)acrylates:

N,N-dimethylaminoethylacrylate, N,N-dimethylaminoethylmeth-acrylate, N,N-diethylaminoethylacrylate and N,N-dimethylaminoneopentylacrylate. The alkyl portion of the alkyl groups attached to the nitrogen atom preferably contain 1 or 2 carbon atoms. The alkylene group between the nitrogen atom and the ester group may contain 2 to 8 carbon atoms.

The following are examples of N- substituted (meth)acryl-amides:

N-methyl-, N-ethyl-, N-n-propyl-, N-isopropyl-, N-n-butyl-acrylamide, N-methyl-methacrylamide, N-(1,1-dimethyl-3-oxobutyl)-acrylamide, N-tertiarybutylmethacrylamide, N-decyl-acrylamide, N-cyclohexylmethacrylamide, N-benzyl-methacrylamide and N-alkoxymethyl(meth)acrylamides such as N-n-butoxymethylacrylamide and N-n-butoxymethyl-meth-acrylamide.

The N- substituents for the (meth)acrylamides may be aliphatic, cycloaliphatic or aromatic groups of the kind present in (meth)acrylamides used in the art for the preparation of acrylate resins. These groups may also contain hetero atoms and in that sense the N- substituents may also be keto groups.

The compounds used as component (b) may be hydroxyacrylates of the kind commonly used in acrylate resins. The following are preferred: hydroxyethyl acrylate, hydroxyethyl methacrylate, 2-hydroxypropyl acrylate, 2-hydroxypropyl methacrylate, 4-hydroxybutyl acrylate and 4-hydroxybutyl methacrylate.

Copolymerizable $\alpha$, $\beta$-olefinically unsaturated compounds of the kind normally used for the preparation of acrylates are used as component (c). The following are examples: aromatic vinyl compounds such as styrene, $\alpha$-methylstyrene, o-, m- and p-methylstyrene and p-tert.-butylstyrene, styrene being preferred; alkyl esters of (meth)acrylic acid, such as methyl-, ethyl-, propyl-, n-butyl-, iso-butyl-, tert.-butyl-, hexyl-, octyl-, decyl-, dodecyl-, hexadecyl- and octadecyl-acrylate and methacrylate; n-butyl-, isobutyl- and tertiarybutylacrylate, 2-ethyl-hexyl acrylate and methyl- and n-butylmethacrylate being preferred; vinyl esters such as vinyl acetate, vinyl propionate and vinyl versatate; and alkyl esters of unsaturated polycarboxylic acids, e.g. of maleic, fumaric, crotonic, itaconic and citric acid.

The proportions by weight of components (a): (b): (c) are preferably within the ranges of 12–30: 30–40: 30–60.

The copolymers according to the invention may be prepared by the usual methods of polymerization, e.g. solvent free, solution or bead polymerization. The various polymerization processes are well known and are described in Houben-Weyl, Methoden der organischen Chemie, 4th edition, volume 14/1, pages 24 to 255 (1961).

The method of solution polymerization is preferred for the preparation of the copolymer according to the invention because the reaction of the hydroxyl functional polymer with partially masked or unmasked polyisocyanates is simpler to carry out by this process and the pigment dispersing agent can be used in the form of a solution.

Polymerization is carried out at temperatures from 60° to 160° C., preferably at 80° to 140° C. The polymerization reaction is started with known polymerization initiators. "Per" compounds and azo compounds are suitable initiators. The latter are preferred because "per" (peroxide) compounds may produce a yellow discoloration in the pigment dispersing agent when the comonomers according to the invention containing tertiary amino groups and N- substituted or unsubstituted acid amide groups are used.

The polymerization initiators, in particular aliphatic azo compounds such as azo-bis-isobutyronitrile (AIBN) are suitably used in quantities of 0.1 to 4% by weight, based on the weight of monomers.

Chain transfer agents such as mercaptans, thioglycolic acid esters or chlorinated hydrocarbons may be used to regulate the molecular weight.

The polymerization conditions (reaction temperature, inflow time of the monomer mixture, concentration of the solution) are so chosen that the numerical average of the molar mass (determined by gel permeation chromatography using polystyrene as calibrating substance) is in the range of 3000 to 100,000.

The copolymers prepared according to the invention have glass transition temperatures in the range of −20° C. to 75° C., calculated from the glass transition temperature of the homopolymers of individual monomers (Fox equation) indicated in the literature.

One essential feature of the pigment dispersing agents of the present invention is that the copolymers described above are reacted with polyisocyanates. The polyisocyanates used according to the invention must contain at least partially unmasked isocyanate groups to react with the OH groups of component A. The polyisocyanates may in addition contain masked isocyanate groups. Partially masked polyisocyanates are preferred.

The masking agents used are CH—, NH— or OH— acidic compounds such as dialkyl malonate, acetoacetic acid alkyl esters, acetylacetone, ε-caprolactam, hydroxybenzoic acid esters, tertiary butanol and oximes such as methylethylketoxime or dimethylketoxime. Ethylacetoacetate, methylethylketoxime and ε-caprolactam, are particularly preferred.

The proportion of polyisocyanates to masking agent is so chosen that after the masking reaction, arithmetically at least one isocyanate group per molecule of polyisocyanate put into the process is freely available for the reaction of the partially masked polyisocyanate with the OH— containing copolymer (component A).

The two resin components which are to be reacted together according to the invention, namely copolymer A and the partially masked or unmasked polyisocyanate B, are preferably used in such proportions that the equivalent ratio of reactive hydroxyl groups in copolymer A to isocyanate groups in the partially masked or unmasked polyisocyanate B lies in the range of 99:1 to 70:30, preferably 95:5 to 85:15.

The polyisocyanates used according to the invention contain biuret, urethane or isocyanurate groups in the molecule, mainly because according to the invention the polyisocyanates used as starting materials are trade products which contain these groups.

As the polyisocyanates used according to the invention for the reaction with component A suitably and preferably contain essentially only one free isocyanate group per molecule, these polyisocyanates may be prepared from trade products by reacting them with the quantity of masking agent which leaves on average or essentially one free isocyanate group per molecule of polyisocyanate. The following are examples of such polyisocyanates: a reaction product of hexamethylene diisocyanate and water containing biuret groups, e.g. a reaction product of 3 mols of hexamethylene diisocyanate and 1 mol of water having an isocyanate content of about 22% (corresponding to trade product Desmodur N ® Bayer); a polyisocyanate containing isocyanurate groups; obtained, for example, by the trimerisation of hexamethylene diisocyanate and having an NCO content of about 21.5% (corresponding to the trade product Desmodur 3390 ® Bayer); or polyisocyanates containing urethane groups, e.g. reaction products of 3 mols of diisocyanate with 1 mol of triol, e.g. toylene diisocyanate and trimethyolpropane (NCO content about 17.5%, corresponding to the trade product Desmodur L ® Bayer).

The pigment dispersion according to the invention is prepared by mixing the components in the usual mixing and grinding apparatus. The pigment dispersing agent prepared as described above may be mixed with pigments and conventional solvents and optionally other conventional additives. According to a particularly preferred embodiment, this mixture may already contain a proportion of the binder which is used in the coating compound into which the pigment dispersion according to the invention is subsequently incorporated when ready for use. This is usual practice in this field. These pigment dispersions already containing binder are designed for special coating compounds containing the corresponding binder.

If the pigment dispersion according to the invention does not contain an addition of binder, it may be used by the lacquer manufacturer for the preparation of any coating compound containing any of various conventional binders since these pigment dispersions according to the invention are suitable for different binder systems. This results in a considerable reduction in cost for the preparation, storage and transport of the pigment dispersion pastes required for the preparation of lacquers.

Since the pigment dispersing agents according to this invention are acrylate copolymers, they are particularly compatible with the usual acrylate-resin lacquer binders and they are therefore particularly suitable for coating compounds which contain acrylate resins as a basis for the binder.

The solvents contained in the pigment dispersion and in the copolymer are preferably organic solvents which may or may not be miscible with water, although water may be used alone or together with a water miscible organic solvent. A neutralizing agent for acid or basic groups may be added to the water. The following are examples of suitable solvents: glycol ethers such as ethylene glycol dimethyl ether; glycol ether esters such as ethylglycol acetate, butylglycol acetate, 3-methoxy-n-butyl acetate, butyldiglycol acetate and methoxy-propyl acetate; esters such as butyl acetate, isobutyl acetate and amyl acetate; ketones such as methylethyl ketone, methylisobutyl ketone, diisobutyl ketone, cyclohexanone, and isophorone.

Aromatic hydrocarbons such as xylene, Solvesso 100 ® (registered trade mark) and aliphatic hydrocarbons may also be used in admixture with the above mentioned solvents.

The pigment dispersion according to the invention may thus be prepared, for example, by mixing the pigment with a solution of the above described pigment dispersing agent in the above described solvents, optionally with the addition of further quantities of solvent and/or the above mentioned binders for the coating compound to form a paste which is then finely dispersed by means of the usual mixing apparatus.

The dispersing apparatus preferably used are shaker machines such as the Red Devil manufactured by Ericksen, ball mills with stirrers or sand mills. Other auxiliary substances commonly used in lacquer technology and optionally used in the present dispersions may be incorporated in the mixture before the pigments are dispersed. For the "lacquering up" (completion), i.e. final preparation of the coating compound or lacquer, the quantity of binder or binder mixture corresponding to the desired volumetric concentration of pigment is used. This "lacquering up" is preferably carried out in an apparatus with high speed stirrer rotating at speeds of about 2000 revs per min. Any of the usual lacquer auxiliaries may be added at this stage. The resulting lacquers may be diluted to a suitable viscosity for application by means of the usual organic solvents and/or water contained in the binder. The pigment dispersions according to the invention may be mixed in any required portions to produce a particular color shade before they are "lacquered up". Lastly, small quantities of a pigment paste according to the invention may be added to the finished lacquer to adjust the color shade.

EXAMPLES OF PREPARATION A TO C

Preparation of partially masked polyisocyanates: composition A (solvent and masking agent in the quantities shown in Table 1) is introduced into a 2-liter three-necked flask equipped with stirrer, contact thermometer and reflux condenser and heated to 60° C. with stirring. composition B (polyisocyanate) is then added and the temperature is raised to 80° C. The reaction mixture is maintained at 80° C. until the masking reaction is completed.

TABLE 1

(weight in grams)

| Position | Component | Examples of preparation a | b | c |
|---|---|---|---|---|
| A | Diethyleneglycol dimethylether | — | 240 | 237 |
| | Methoxypropyl acetate | 92 | — | — |
| | Xylene | 150 | — | — |
| | Caprolactam | — | 177 | — |
| | Methylethylketoxime | — | — | 144 |
| | Ethyl acetoacetate | 197 | — | — |
| | Zinc (II) acetylacetonate | 1 | — | — |
| B | Desmodur N 3390/90 ® Bayer (polyisocyanate, NCO content of 21.5%) | 560 | 583 | 619 |
| | | 1000 | 1000 | 1000 |
| Characteristics | | | | |
| Solids content (%) | | 64.1 | 69.8 | 68.4 |
| Viscosity (mPa.s at 25° C.) | | 186 | 660 | 410 |
| Isocyanate index | | 4.6 | 3.3 | 3.1 |

EXAMPLES 1 TO 5

Solvent of composition I (quantities shown in Table 2) is introduced into a 4-liter, three-necked flask equipped with stirrer, contact thermometer, round bottomed condenser and two dropping funnels and heated to 100° C. with stirring.

Composition II (monomer mixture) and composition III (azo-bis-isobutyronitrilesolution) are continuously added both at the same time from dropping funnels over a period of 5 hours while the temperature is kept constant at 100° C. Composition IV (azo-bis-isobutyronitrile solution) is added after this inflow period. The dropping funnels are then rinsed with solvent from position V and the solvent is added to the reaction mixture.

After-polymerization of the reaction mixture is then carried out for 3 hours at 100° C. until conversion is 98%. The polymer is then diluted with solvent from position V1 and cooled to 60° C.

Urethanisation is brought about by the addition of composition V11 (partially masked polyisocyanate, Table (1) and a 2 hours reaction time at 60° C. The pigment dispersing agent obtained is virtually free from NCO groups.

TABLE 2

(weight in grams)

| COMPOSITION | COMPONENT | 1 | 2 | 3 | 4 | 5 |
|---|---|---|---|---|---|---|
| I | Diethyleneglycol dimethylether | — | — | — | 336 | 336 |
| | Butyl acetate | 200 | 200 | 200 | — | — |
| | Xylene | 132 | 132 | 132 | — | — |
| II | Cyclohexylmethacrylamide | — | — | 145 | — | — |
| | Dimethylaminoethylmethacrylate | — | — | 137 | — | — |
| | Dimethylaminopropylmethacrylamide | 149 | 200 | — | 200 | 200 |
| | Butylmethacrylate | 93 | — | — | — | — |
| | 2-ethylhexylacrylate | 93 | 98 | 56 | 98 | 98 |
| | 2-hydroxypropylmethacrylate | 375 | 380 | 373 | 380 | 380 |
| | Isobutylmethacrylate | — | 160 | — | 160 | 160 |
| | Methylmethacrylate | 186 | 78 | — | 78 | 78 |
| | tert.-butylacrylate | — | — | 187 | — | — |
| | Styrene | 167 | 169 | 166 | 169 | 169 |
| III | Diethyleneglycol dimethylether | — | — | — | 406 | 406 |
| | Butyl acetate | 270 | 270 | 270 | — | — |
| | Xylene | 143 | 143 | 143 | — | — |
| | Azo-bis-isobutyronitrile | 17 | 17 | 17 | 24 | 24 |
| IV | Diethyleneglycol dimethylether | — | — | — | 140 | 140 |
| | Butyl acetate | 90 | 90 | 90 | — | — |
| | Xylene | 48 | 48 | 48 | — | — |

TABLE 2-continued (weight in grams)

|   |   | EXAMPLES | | | | |
|---|---|---|---|---|---|---|
|   |   | 1 | 2 | 3 | 4 | 5 |
| V | Azo-bis-isobutyronitrile | 6 | 6 | 6 | 4 | 4 |
|   | Diethyleneglycol dimethylether | — | — | — | 20 | 20 |
|   | Butyl acetate | 20 | 20 | 20 | — | — |
| VI | Diethyleneglycol dimethylether | — | — | — | 403 | 403 |
|   | Butyl acetate | 429 | 407 | 428 | — | — |
| VII | Partially masked polyisocyanate | | | | | |
|   | TABLE 1: Example (a) | 82 | 82 | 82 | — | — |
|   | Example (b) | — | — | — | 82 | — |
|   | Example (c) | — | — | — | — | 82 |
|   |   | 2500 | 2500 | 2500 | 2500 | 2500 |
| Properties | | | | | | |
| Solids contents (%) | | 44.5 | 44.0 | 44.3 | 44.2 | 44.5 |
| Viscosity (mPa.s at 25° C.) | | 2680 | 1080 | 810 | 420 | 420 |

EXAMPLE 6

(a) Preparation of a black pigment dispersion. 85.8 parts by weight of a solution having a solids content of 74.2% by weight of an acrylate resin of the kind conventionally used for lacquers and described in detail below, 3.8 parts by weight of one of the solutions of pigment dispersing agents obtained in Example 1, 2 or 3, 4 or 5 5.6 parts by weight of a calcium naphthenate solution having a solids content of 65% by weight and 4.8 parts by weight of a pigment carbon black are mixed in a dissolver and then ground in a Sussemeyer ball mill with stirrer.

The acrylate resin used was prepared by the following method which is analogous to that of Example 1 of DE-C-26 03 259:

310 g of Xylene and 186 g of glycidyl esters of $\alpha,\alpha$-di-alkylalkane monocarboxylic acids having the overall formula $C_{13}H_{24}O_3$ and an average epoxide equivalent of 245, hereinafter referred to as glycidyl esters of $\alpha,\alpha$-dialkyl mono-carboxylic acids, are heated to 142° C. in a flask equipped with stirrer, reflux condenser and thermometer, and a mixture of 145 g of methylmethacrylate, 135 g of hydroxy-ethylmethacrylate, 6 g of tert. dodecylmercaptan, 195 g of styrene, 57 g of acrylic acid and 15 g of di-tert.-butyl peroxide is added at a uniform rate over 3 hours and the reaction mixture is polymerized and condensed for about 4 to 5 hours at 135° C. The product obtained has a solids content of 70% by weight. The solution diluted to a solids content of 50% with ethylglycol acetate is found to have a viscosity of 130 seconds, measured in a DIIN cup with 4 mm outflow opening, at 25° C. The hydroxyl group content is 4.24%, based on the solids content in the copolymer. After removal of the solvent, the copolymer melts over a range of 70° to 72° C. The acid number of the copolymer is 10.

(b) Preparation of a black paint, using pigment dispersion (a). 39 parts by weight of the pigment dispersion (a) and 61 parts by weight of the known acrylate resin described in Example 6(a) were mixed together with stirring. The coating compound obtained was an acrylic car lacquer which showed excellent stability of the dispersed carbon black particles. No coarsening of grain or floating of pigment particles was observed either when the lacquer was dried in air or when it was mixed with various other lacquers obtained by similar methods.

EXAMPLE 7

This example illustrates the preparation of various colored pigment dispersions and their use for the preparation of paints:

(a) Pigment dispersion with phthalocyanine green pigment. The following components:

Pigment dispersing agent from Example 1: 8 parts by weight
Known acrylate resin described in Example 6(a): 83.3 parts by weight
Phthalocyanine green pigment: 8.5 parts by weight
Solsperse 5000 ®: 0.2 parts by weight were mixed in a dissolver and dispersed in a Sussmeyer ball mill with stirrer.

Solsperse 5000 is a dispersing additive manufactured by ICI and has been described in the appropriate data sheets and in the publication by J. Toole, Developments in Hyperdispersants Technology for Paints; Paint & Resin, February 1985.

(b) Pigment dispersion containing phthalocyanine blue pigment. The following components:

Pigment dispersing agent from Example 1: 6 parts by weight
Known acrylate resin described in Example 6(a): 88.05 parts by weight
Phthalocyanine blue pigment: 5.9 parts by weight
Solsperse 5000 ®: 0.05 parts by weight were mixed in a dissolver and dispersed in a Sussmeyer ball mill with stirrer.

(c) Pigment dispersion containing quinacridone pigment. The following components:

Pigment dispersing agent from Example 1: 10.8 parts by weight
Known acrylate resin described in Example 6(a): 82 parts by weight
Quinacridone magenta pigment: 7.2 parts by weight were mixed in the dissolver and dispersed in a Sussmeyer ball mill with stirrer.

(d) Green car lacquer. 47 parts by weight of the green pigment dispersion from Example 7(a) were mixed with 53 parts by weight of the known acrylate resin described in Example 6(a).

(e) Blue car lacquer. 53.8 parts by weight of the blue pigment dispersion from Example 7(b) were mixed with 46.2 parts by weight of the known acrylate resin described in Example 6(a).

(f) Red car lacquer. 84 parts by weight of the red pigment dispersion from Example 7(c) were mixed with 16 parts by weight of the known acrylate resin described in Example 6(a).

Phenomena such as flocculation, coflocculation, loss of gloss and flotation of pigments, which cannot be adequately overcome with the usual dispersing auxiliaries mentioned in the introduction, are virtually absent in Examples (d), (e) and (f).

EXAMPLE 8

Preparation of a blue tint paste. 100 parts by weight of the blue pigment dispersion from Example 7(b) are thoroughly mixed with 100 parts by weight of the black paste from Example 6(a). The resulting blue tint paste and the lacquer obtained after addition of the appropriate quantity of the known acrylate resin described in Example 6(a) show no coarsening of grain and no reduction in gloss compared with that of mono pigmented lacquers such as occurs in analogous dispersions prepared from commercially available dispersing auxiliaries in accordance with the manufacturers instructions.

Other lacquers equally free from flocculation are obtained from mixtures of equal parts of black paste (Example 6(a), blue paste (Example 7(b) and a white tinted paste prepared analogously from $TiO_2$ pigment. Neither flocculation nor flotation of pigments occurs.

The above examples illustrate pigment dispersions which, as mentioned above, in addition contain a conventional acrylate resin binder. The following examples illustrate pigment dispersions which do not contain such additional binders.

EXAMPLE 9

(a) Yellow pigment dispersion containing yellow C.I.P.Y. 110.
  26.7 parts by weight of pigment dispersing agent (Example 1)
  57.3 parts by weight of solvent mixture xylene/butyl acetate (1:1)
  16.0 parts by weight of pigment yellow C.I.P.Y. 110 were mixed in the dissolver (5 min.) and then dispersed in a pearl mill. The degree of fineness of grain obtained was <10 μm.
  (b) Yellow car lacquer.
  34.3 parts by weight of yellow pigment dispersion from 9(a) and
  65.7 parts by weight of the known acrylate resin described in Example 6(a)
were mixed with vigorous stirring.

EXAMPLE 10

(a) Reddish violet pigment dispersion containing red C.I.P.R. 88.
  45.1 parts by weight of pigment dispersing agent (Example 1) and
  27.7 parts by weight of pigment red C.I.P.R. 88
were mixed in the dissolver (5 min.). 27.2 parts by weight of the solvent mixture xylene/butyl acetate (1:1) were then stirred in and the mixture was dispersed in a pearl mill.
The degree of fineness obtained was <10 μm.
  (b) Reddish violet car lacquer.
  18.0 parts by weight of reddish violet pigment dispersion from Example 10(a) and
  82.0 parts by weight of the known acrylate resin described in Example 6(a)
were mixed with vigorous stirring.

EXAMPLE 11

(a) Black pigment dispersion containing black C.I.P.B1. 7 (channel black)
  31.2 parts by weight of pigment dispersing agent Example 1),
  9.5 parts by weight of solvent mixture xylene/butyl acetate (1:1),
  13.9 parts by weight 6f pigment black C..P.B1.7 and
  13.9 parts by weight of 65% calcium naphthenate solution
were mixed in a dissolver (5 min.). 31.5 parts by weight of solvent mixture xylene/butyl acetate (1:1) were then stirred in and the mixture was dispersed in a pearl mill. The degree of fineness obtained was <10 μm.
  (b) Black car lacquer.
  2.5 parts by weight of black pigment dispersion from Example 11(a) and
  7.5 parts by weight of known acrylic resin described in Example 6(a)
were mixed together with vigorous stirring.

EXAMPLE 12

(a) White pigment dispersion.
  4.0 parts by weight of pigment dispersing agent (Example 1),
  1.0 parts by weight of Bykumen ®
  2.5 parts by weight of thixotropic agent,
  51.3 parts by weight of known acrylic resins described in Example 6(a) and
  41.2 parts by weight of white titanium dioxide C.I.P.W. 6
were dispersed in the dissolver for 2 minutes. The degree of fineness obtained was <12 μm.
  (b) White car lacquer.
  61.1 parts by weight of a white grinding base from (a) and
  38.9 parts by weight of known acrylate resin described in Example 6(a)
were mixed together with vigorous stirring.

The lacquers obtained from Examples 9 to 12 may be used alone or as any mixtures. The desired color shade can be obtained by mixing various suitable lacquers.

The pigment dispersions obtained in Examples 9 to 11 have a very low residual viscosity in spite of their higher pigment content. These pigment dispersions are very suitable for grinding in ball mills with stirrers.

What is claimed is:
1. A pigment dispersion composition suitable for the preparation of coating compounds and containing at least one pigment and an organic solvent and a pigment dispersing agent, said pigment dispersing agent comprising a copolymer containing OH groups and having a hydroxyl number of at least 60, and ethylenically unsaturated monomers incorporated by polymerization, characterized in that the copolymer is obtainable by the reaction of:
(A) 80 to 95% by weight of a copolymer of:
  (a) 0.5 to 40% by weight of N,N-di-$C_1$ to $C_4$-alhylamino-$C_1$ to $C_8$-alkyl(meth)acrylamides and-/or a mixture of N,N-di-$C_1$ to $C_4$-alkylamino-$C_1$ to $C_8$-alkyl(meth)acrylates and N- substituted (meth)acrylamides and/or (meth)acrylamide in which the ratio of amino(meth)acrylates to amido(meth)acrylates are in the range of from 1:2 to 2:1,
  (b) 10 to 40% by weight of hydroxy-$C_2$-$C_8$-alkyl (meth)acrylates and

(c) 20 to 89.5% by weight of copolymerizable, α,β-olefinically unsaturated compounds with (B) 5 to 20% by weight of polyisocyanate containing unmasked and optionally also masked isocyanate groups as well as biuret, urethane or isocyanurate groups.

2. A pigment dispersion according to claim 1, characterized in that it also contains a binder.

3. Coating compositions comprising the pigment dispersion composition of claim 1, a binder and an organic and/or aqueous carrier.

4. A coating composition comprising the pigment dispersion composition of claim 1 and an acrylate resin binder.

5. A pigment dispersion composition according to claim 1 wherein the copolymer has a hydroxyl number of from about 80 to about 150.

6. A pigment dispersion composition according to claim 1 wherein the ratio of amino(meth)acrylates to amido(meth)acrylates are in the range of 1:1.1 to 1.1:1.

7. A pigment dispersion composition according to claim 1 wherein the ratios of the components (a):(b) and :(c) are within the ranges of 12-20; 30-40 and 30-60 respectively.

8. A pigment dispersion composition according to claim 1 wherein the copolymers of A and B have calculated glass transition temperatures of from about −20° C. to about 75° C.

* * * * *

UNITED STATES PATENT AND TRADEMARK OFFICE
CERTIFICATE OF CORRECTION

PATENT NO. : 4,839,414

DATED : June 13, 1989

INVENTOR(S) : Klaus Bederke, et al

It is certified that error appears in the above-identified patent and that said Letters Patent is hereby corrected as shown below:

In the Abstract, definition of (a) lines 1-3, delete [N,N-di-C1 to 4-alkylamino-$C_1$ to $_8$-alkyl(meth)acrylamides and/or a mixture of N,N-di-C to 4-alkylamino], and
insert instead -- N,N-di-$C_{1 \text{ to } 4}$-alkylamino-$C_{1 \text{ to } 8}$-alkyl(meth)acrylamides and/or a mixture of N,N-di-$C_{1 \text{ to } 4}$-alkylamino --;

Column 1, line 40, delete [alkyl] and insert instead -- alkyd --;

Column 2, line 19, delete [unusable] and insert instead -- usuable --;

, lines 57-59, delete [N,N-di-$C_1$ to 4-alkylamino-$C_1$ to 8-alkyl(meth)acrylamides and/or a mixture of N,N-di-$C_1$ to 4-alkylamino-$C_1$ to 8-alkyl(meth)acrylates], and
insert instead -- N,N-di-$C_{1 \text{ to } 4}$-alkylamino-$C_{1 \text{ to } 8}$-alkyl(meth)acrylamides and/or a mixture of N,N-di-$C_{1 \text{ to } 4}$-alkylamino-$C_{1 \text{ to } 8}$-alkyl(meth)acrylates --;

, lines 64-65, delete [hydroxy-$C_2$-8-alkyl(meth)acrylates, preferably hydroxy-$C_2$-4-alkyl(meth)acrylates], and
insert instead -- hydroxy-$C_{2-8}$-alkyl(meth)acrylates, preferably hydroxy-$C_{2-4}$-alkyl(meth)acrylates --;

UNITED STATES PATENT AND TRADEMARK OFFICE
CERTIFICATE OF CORRECTION

PATENT NO. : 4,839,414

DATED : June 13, 1989

INVENTOR(S) : Klaus Bederke, et al

It is certified that error appears in the above-identified patent and that said Letters Patent is hereby corrected as shown below:

Column 3, line 65-66, delete [N,N-di-C to 4-alkylamino-C to 8-alkyl(meth) acrylamides], and
    insert instead -- $N,N-di-C_{1\ to\ 4}$-alkylamino-$C_{1\ to\ 8}$-alkyl(meth)acrylamides --;

Column 4, lines 4-11, delete [$N,N-di-C_1$ to 4-amino-$C_1$ to 8-alkyl(meth)acrylamides there may be used a mixtures of $N,N-di-C_1$ to 4-alkylamino-$C_1$ to 8-alkyl(meth)acrylates and N- $C_1$ to 12 alkyl(meth)acrylamides or N-$C_1$ to 12 cycloalkyl (meth)acrylamides or N-$C_1$ to 12-aralkyl(meth)acrylamides and/or (meth)acrylamide. The following are examples of $N,N-di-C_1$ to 4-alkylamino-$C_1$ to 8-alkyl(meth)acrylates], and
    insert instead -- $N,N-di-C_{1\ to\ 4}$-amino-$C_{1\ to\ 8}$-alkyl(meth)acrylamides there may be used a mixtures of $N,N-di-C_{1\ to\ 4}$-alkylamino-$C_{1\ to\ 8}$-alkyl(meth)acrylates and $N-C_{1\ to\ 12}$ alkyl(meth)acrylamides or $N-C_{1\ to\ 12}$ cycloalkyl (meth)acrylamides or $N-C_{1\ to\ 12}$-aralkyl(meth)acrylamides and/or (meth)acrylamide. The following are examples of $N,N-di-C_{1\ to\ 4}$-alkylamino-$C_{1\ to\ 8}$-alkyl(meth)acrylates --.

UNITED STATES PATENT AND TRADEMARK OFFICE
CERTIFICATE OF CORRECTION

PATENT NO. : 4,839,414
DATED : June 13, 1989
INVENTOR(S) : Klaus Bederke, et al

It is certified that error appears in the above-identified patent and that said Letters Patent is hereby corrected as shown below:

Column 6, line 17, delete [toylene] and insert instead -- tolulene --;

Column 7, line 12, delete [Ericksen] and insert instead -- Erichsen --;

Column 9, line 52, delete [DIIN] and insert instead -- DIN --;

Claim 1, column 12, line 61, delete [alhylamino] and insert instead -- alkylamino --;

Claim 7, column 14, line 9, delete [12-20; 30-40 and 30-60] and insert instead -- 12-20 : 30-40 : 30-60 --.

Signed and Sealed this

First Day of October, 1991

Attest:

HARRY F. MANBECK, JR.

*Attesting Officer*   *Commissioner of Patents and Trademarks*